United States Patent
Kouyama

(10) Patent No.: US 7,443,942 B2
(45) Date of Patent: Oct. 28, 2008

(54) RECEIVING DEVICE AND RECEIVING METHOD

(75) Inventor: Tadahisa Kouyama, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 639 days.

(21) Appl. No.: 10/297,607

(22) PCT Filed: Jun. 14, 2001

(86) PCT No.: PCT/JP01/05060

§ 371 (c)(1),
(2), (4) Date: May 13, 2003

(87) PCT Pub. No.: WO01/97423

PCT Pub. Date: Dec. 20, 2001

(65) Prior Publication Data

US 2004/0013218 A1 Jan. 22, 2004

(30) Foreign Application Priority Data

Jun. 15, 2000 (JP) .............................. 2000-179835

(51) Int. Cl.
*H03D 3/24* (2006.01)
(52) U.S. Cl. ...................... 375/376; 375/148; 375/150; 375/147; 375/152; 370/335; 370/342
(58) Field of Classification Search ............... 375/376, 375/148, 150, 200, 152, 147, 349; 370/342, 370/335
See application file for complete search history.

(56) References Cited

U.S. PATENT DOCUMENTS 5,970,084 A * 10/1999 Honda ........................ 375/147

(Continued)

FOREIGN PATENT DOCUMENTS

JP 6-125329 5/1994

(Continued)

OTHER PUBLICATIONS

Wern-Ho Sheen et al., 8089 IEEE Transactions on Communications, 43 (1995) Dec. No. 12, New York, US, pp. 3063-3072.

(Continued)

*Primary Examiner*—Chieh M. Fan
*Assistant Examiner*—Eva Puente
(74) *Attorney, Agent, or Firm*—Westerman, Hattori, Daniels & Adrian, LLP.

(57) ABSTRACT

A receiver for CDMA enables a reduction in a circuit scale including a matched filter and lessening of loads stemming from despread processing. A speed conversion section 10 down-samples a received signal which has been over-sampled at a ratio of four times a chip rate, whereby a matched filter 20 is operated at a two-times oversampling ratio, thereby detecting a path timing. The detected path timing is sent to timing adjustment sections 60 of fingers 30. On the basis of a difference value computed by the DLLs 40, the path timing is corrected, thereby producing a demodulation timing. At the time of correction operation, the path timing is shifted so as to advance or lag by an amount corresponding to one clock cycle of a four-times oversampling frequency.

20 Claims, 9 Drawing Sheets

U.S. PATENT DOCUMENTS

| | | | |
|---|---|---|---|
| 6,208,632 B1 * | 3/2001 | Kowalski et al. | 370/335 |
| 6,282,234 B1 * | 8/2001 | Kameno et al. | 375/148 |
| 6,487,193 B1 * | 11/2002 | Hamada et al. | 370/342 |
| 2002/0006158 A1 * | 1/2002 | Schmidl et al. | 375/150 |

FOREIGN PATENT DOCUMENTS

| | | |
|---|---|---|
| JP | 8-172417 | 7/1996 |
| JP | 10-209918 | 8/1998 |
| JP | 2000-40982 | 2/2000 |
| JP | 2000-82973 | 3/2000 |
| JP | 2001-94474 | 4/2001 |
| WO | WO 96/10879 | 4/1996 |
| WO | WO 96/10879 A1 | 4/1996 |
| WO | WO 99/65157 | 12/1999 |
| WO | WO 99/65157 A2 | 12/1999 |
| WO | WO 00/21201 | 4/2000 |
| WO | WO 00/21201 A2 | 4/2000 |

OTHER PUBLICATIONS

Decision to Refuse a European Patent Application of Corresponding European Patent Application No. 01 941 043.0 dated Jun. 27, 2007.
Communication Pursuant to Article 96(2) EPC of Corresponding European Patent Application No. 01 941 043.0 dated Feb. 23, 2005.

* cited by examiner

FIG. 8
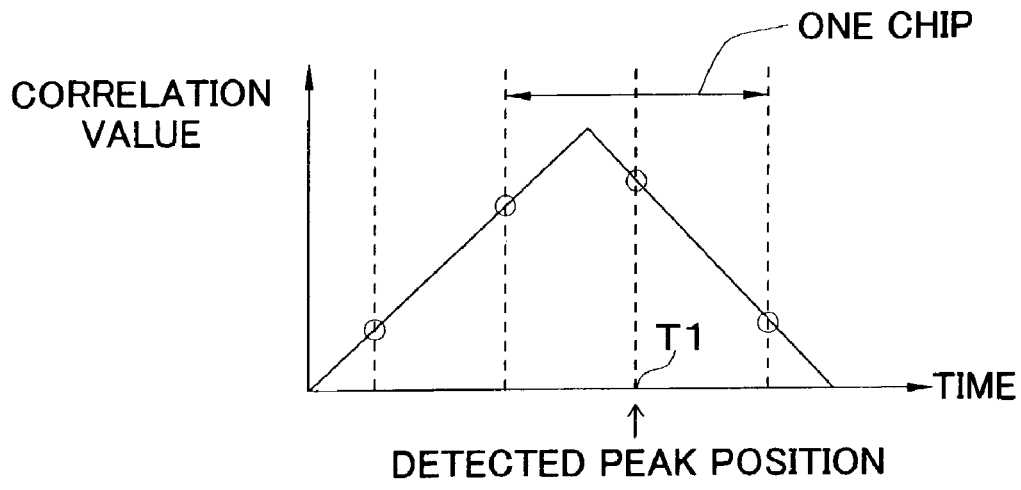
(a)
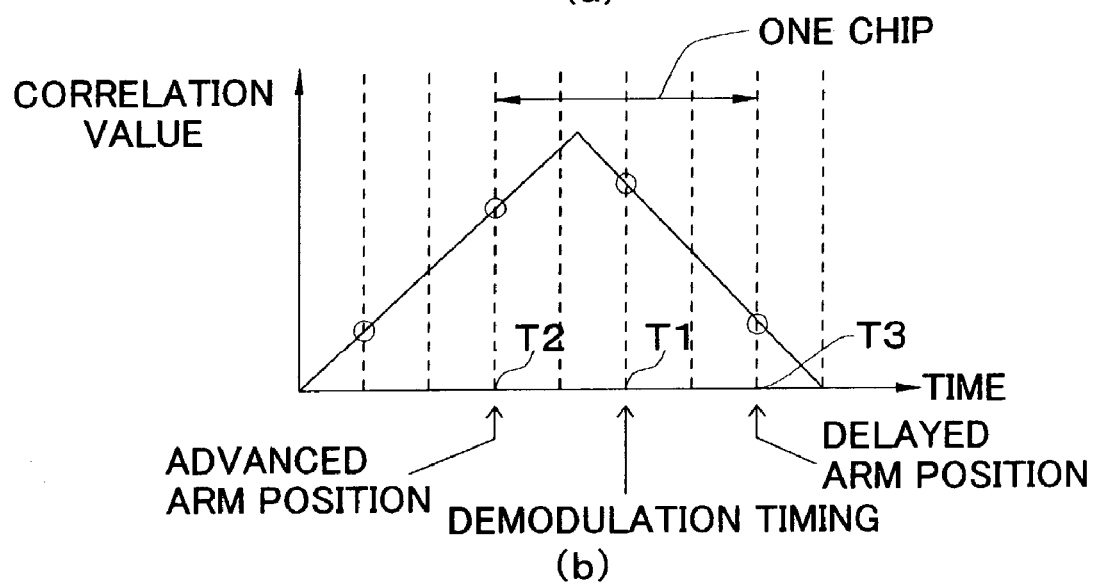
(b)
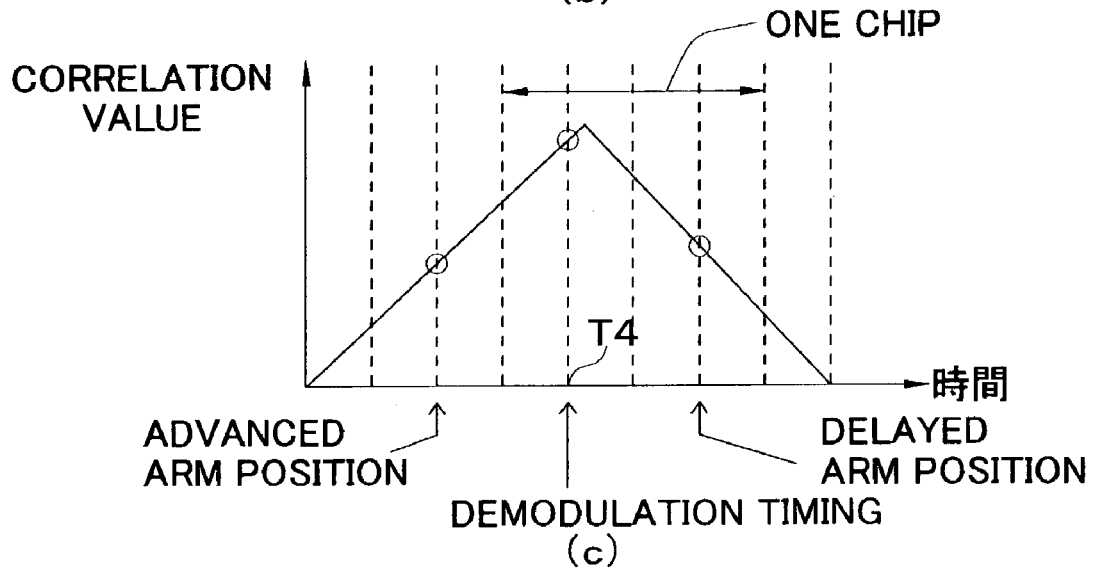
(c)

FIG. 9
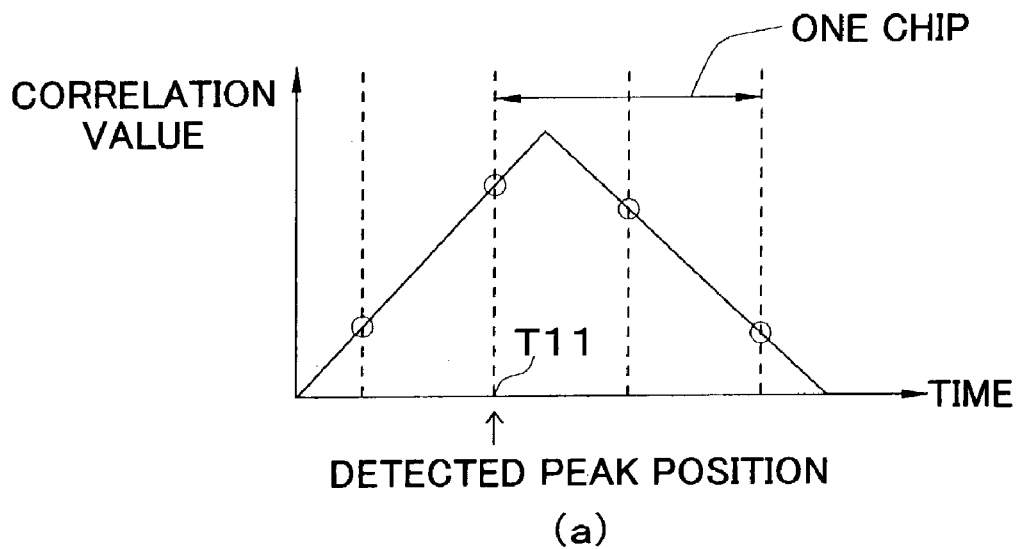
(a)
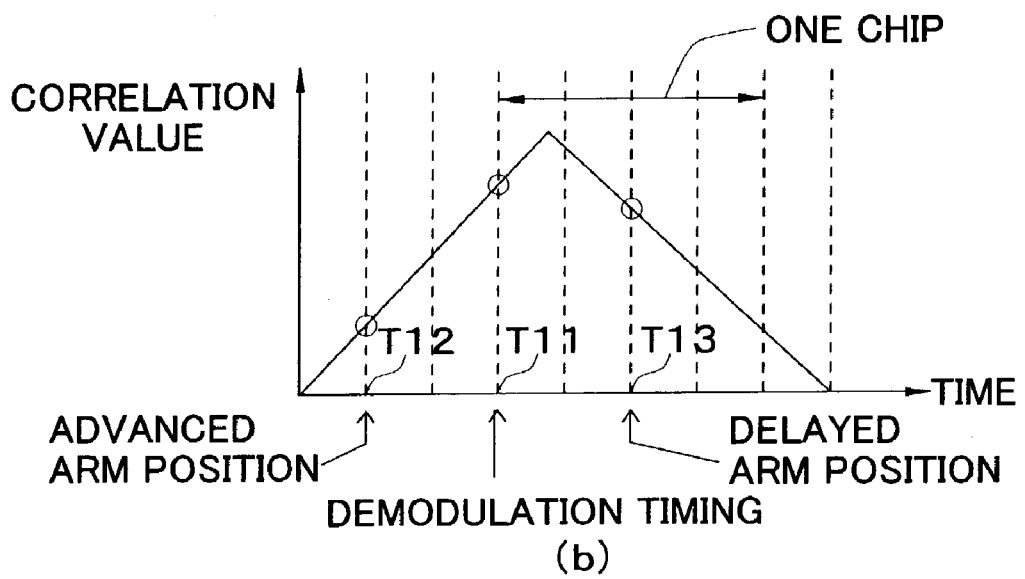
(b)
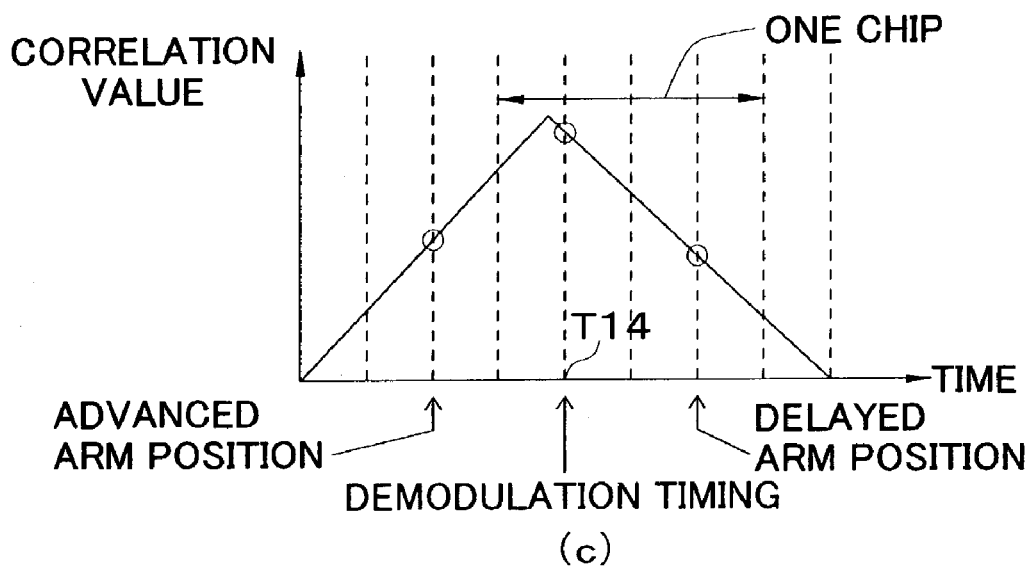
(c)

RECEIVING DEVICE AND RECEIVING METHOD

FIELD OF THE INVENTION

The invention relates to a CDMA (code-division multiple access) receiver employing a direct sequence CDMA communication scheme.

BACKGROUND ART

A CDMA receiver employing a direct sequence CDMA communication scheme is equipped with a path searcher for seeking a despread timing. The path searcher is in turn equipped with a matched filter or a sliding correlator. In the case where the matched filter is provided, the matched filter is provided with a delay device, a multiplier, and an adder.

As a sampling frequency used for sampling a received signal becomes higher, a despread timing (i.e., a path timing) can be detected with high accuracy. However, if oversampling is effected for increasing a sampling frequency, the matched filter will require delay devices which are equal in number to a multiple of an oversampling ratio.

To solve this problem, a CDMA receiver described in Japanese Patent Application Laid-Open No. 82973/2000 is provided with first and second circuit sections. The first circuit section is constituted of a matched filter for allowing input of a signal received through low-speed oversampling, and is used for detecting a coarse despread timing. The second circuit section is equipped with an integrator and a matched filter. On the basis of the coarse despread timing detected by the first circuit section, a highly accurate despread timing is determined through high-speed oversampling.

However, in the CDMA receiver described in Japanese Patent Application Laid-Open No. 82973/2000, the second circuit section performs processing after the first circuit section has performed processing. Path search processing involves consumption of time; consequently, there arises a problem of overall despread processing consuming a considerable amount of time. Although the first circuit section can be made compact, a necessity for use of the second circuit section arises. On the whole, not much reduction in the size of circuitry is achieved.

The invention aims at providing a CDMA receiver which can render compact a circuit including a matched filter and diminish load stemming from despread process.

DISCLOSURE OF THE INVENTION

The invention has been conceived to solve the problem. First, a receiver of CDMA communications scheme comprises a matched filter which operates at a frequency of one-over-n ("n" is an integer) times the sampling frequency of a received signal and detects a path timing; and a finger section for despreading the received signal, wherein the finger section comprises a DLL which operates at the sampling frequency of the received signal and computes a difference value representing an offset between the received signal and a demodulation timing specified by a path timing detected by the matched filter; a timing adjustment section which outputs a timing signal of predetermined cycle while the path timing detected by the matched filter is taken as a reference and which compensates for the phase of the timing signal on the basis of the difference value computed by the DLL; and a despread section which performs despreading operation at a demodulation timing specified by the timing signal output from the timing adjustment section.

In the receiver of the first configuration, the matched filter operates at a frequency of one-over-n ("n" is an integer) times the sampling frequency of a received signal and detects a path timing. The DLL provided in the finger section computes a difference value representing an offset between the received signal and a demodulation timing. The timing adjustment section compensates for the phase of the timing signal on the basis of the difference value. Specifically, the timing adjustment section causes the phase of the timing signal to advance or delay in a predetermined situation; for example, when an absolute value of the difference value is greater than a predetermined threshold value. More specifically, when the demodulation timing lags behind the received signal, the phase of the timing signal is caused to advance. In contrast, when the demodulation timing is advanced in relation to the received signal, the phase of the timing signal is caused to delay. The despread section performs despreading operation at the demodulation timing specified by the timing adjustment section.

According to the receiver of the first configuration, the matched filter operates at a frequency of one-over-n ("n" is an integer) times the sampling frequency of a received signal, thereby enabling a reduction in the size of a circuit of the matched filter. The demodulation timing roughly ascertained by the matched filter is compensated on the basis of information output from the DLL. The DLL, which is originally provided in the CDMA receiver, is utilized, thereby preventing an increase in the size of a circuit of the receiver and processing load. A correlation peak position can be detected with an accuracy of sampling frequency, and hence demodulation operation can be performed with a superior signal-to-noise ratio.

Second, in relation to the first configuration, the timing adjustment section compensates for the phase of the timing signal in a predetermined situation and in accordance with a result of comparison between the difference value computed by the DLL and a predetermined threshold value. For instance, when the magnitude of the difference value is greater than a predetermined threshold value, the compensation operation is performed.

Third, in relation to the first or second configuration, the timing adjustment section causes the phase of the timing signal to advance when the magnitude of the difference value computed by the DLL exceeds a predetermined threshold value and when the difference value represents that the demodulation timing lags behind the received signal, and causes the phase of the timing signal to delay when the magnitude of the difference value computed by the DLL exceeds the predetermined threshold value and when the difference value represents that the demodulation timing is advanced in relation to the received signal. In this way, the phase of the timing signal can be compensated.

Fourth, in relation to the first or second configuration, the timing adjustment section causes the phase of the timing signal to advance when the difference value computed by the DLL is positive and exceeds a predetermined threshold value; and causes the phase of the timing signal to delay when the difference value computed by the DLL is negative and less than a second threshold value, which threshold value corresponds to the predetermined threshold value when it is made negative.

Fifth, in relation to the first, second, third, or fourth configuration, the timing adjustment section causes the phase of the timing signal to advance or delay by an amount corresponding to one clock cycle or a plurality of clock cycles of sampling frequency of the received signal when the phase of the timing signal is compensated.

Sixth, in relation to the first, second, third, fourth, or fifth configuration, the timing adjustment section first outputs the timing signal after a predetermined period of time has lapsed from a path timing detected by a matched filter and compensates for the phase of the timing signal in accordance with the difference value computed by the DLL.

Seventh, in relation to the first, second, third, fourth, fifth, or sixth configuration, the DLL comprises a first generator for outputting a spreading code on the basis of a timing signal output from the timing adjustment section; a third generator for outputting a spreading code while lagging behind the timing at which the first generator produces an output, by a delay period corresponding to a period of two chips or less; and a second generator for outputting a spreading code while lagging behind half the delay period.

Eighth, in relation to the first, second, third, fourth, fifth, sixth, or seventh configuration, the receiver further comprises a conversion section which down-samples the received signal to a frequency of one-over-n ("n" is an integer) times the sampling frequency of the received signal and outputs the down-sampled received signal to the matched filter. As a result, the received signal that has been subjected to down-sampling can be sent to the matched filter.

Ninth, a receiving method of CDMA communications scheme, comprises: a path timing detection step of detecting a path timing through use of a matched filter which operates at a frequency of one-over-n ("n" is an integer) times the sampling frequency of a received signal and detects a path timing; a difference value computation step of computing a difference value representing an offset between the received signal and a demodulation timing specified by a path timing detected in the path timing detection step, through use of a DLL which operates at the sampling frequency of the received signal; a timing signal output process for outputting a timing signal of predetermined cycle while the path timing detected in the path timing detection step is taken as a reference; and a compensation step of compensating for the phase of the timing signal to be output in the timing signal output process, on the basis of the difference value computed in the difference value computation step.

Therefore, according to the receiving method of the ninth configuration, the matched filter is operated at a frequency of one-over-n ("n" is an integer) times the sampling frequency of a received signal, thereby enabling a reduction in the size of a circuit of the matched filter. The demodulation timing roughly ascertained by the matched filter is compensated on the basis of information output from the DLL. The DLL, which is originally provided in the CDMA receiver, is utilized, thereby preventing an increase in the size of a circuit of the receiver and processing load. A correlation peak position can be detected with an accuracy of sampling frequency, and hence demodulation operation can be performed with a superior signal-to-noise ratio.

Tenth, in relation to the ninth configuration, the phase of the timing signal is compensated in the compensation step in a predetermined situation and in accordance with a result of comparison between the difference value computed in the difference value computation step and a predetermined threshold value. For instance, when the magnitude of the difference value is greater than a predetermined threshold value, the compensation operation is performed.

Eleventh, in relation to the ninth or tenth configuration, the phase of the timing signal is caused to advance in the compensation step when the magnitude of the difference value computed in the difference value computation step exceeds a predetermined threshold value and when the difference value represents that the demodulation timing lags behind the received signal, and the phase of the timing signal is caused to delay in the compensation step when the magnitude of the difference value computed in the difference value computation step exceeds the predetermined threshold value and when the difference value represents that the demodulation timing is advanced in relation to the received signal.

Twelfth, in relation to the ninth or tenth configuration, the phase of the timing signal is caused to advance in the compensation step when the difference value computed in the difference value computation step is positive and exceeds a predetermined threshold value, and the phase of the timing signal is caused to delay in the compensation step when the difference value computed in the difference value computation step is negative and less than a second threshold value, which threshold value corresponds to the predetermined threshold value when it is made negative.

Thirteenth, in relation to the ninth, tenth, eleventh, or twelfth configuration, the phase of the timing signal is caused to advance or delay by an amount corresponding to one clock cycle or a plurality of clock cycles of sampling frequency of the received signal when the phase of the timing signal is compensated in the compensation step.

Fourteenth, in relation to the ninth, tenth, eleventh, twelfth, or thirteenth configuration, the timing signal is first output in the timing signal output step after a predetermined period of time has lapsed from a path timing detected in the path timing detection step, and the phase of the timing signal is compensated in the compensation step in accordance with the difference value computed in the compensation step.

BRIEF DESCRIPTION OF THE DRAWINGS

FIG. 8 is a descriptive view showing the operation of a receiver according to the embodiment of the invention; and FIG. 9 is a descriptive view showing the operation of a receiver according to the embodiment of the invention.

BEST MODE FOR IMPLEMENTING THE INVENTION

Figure 1:
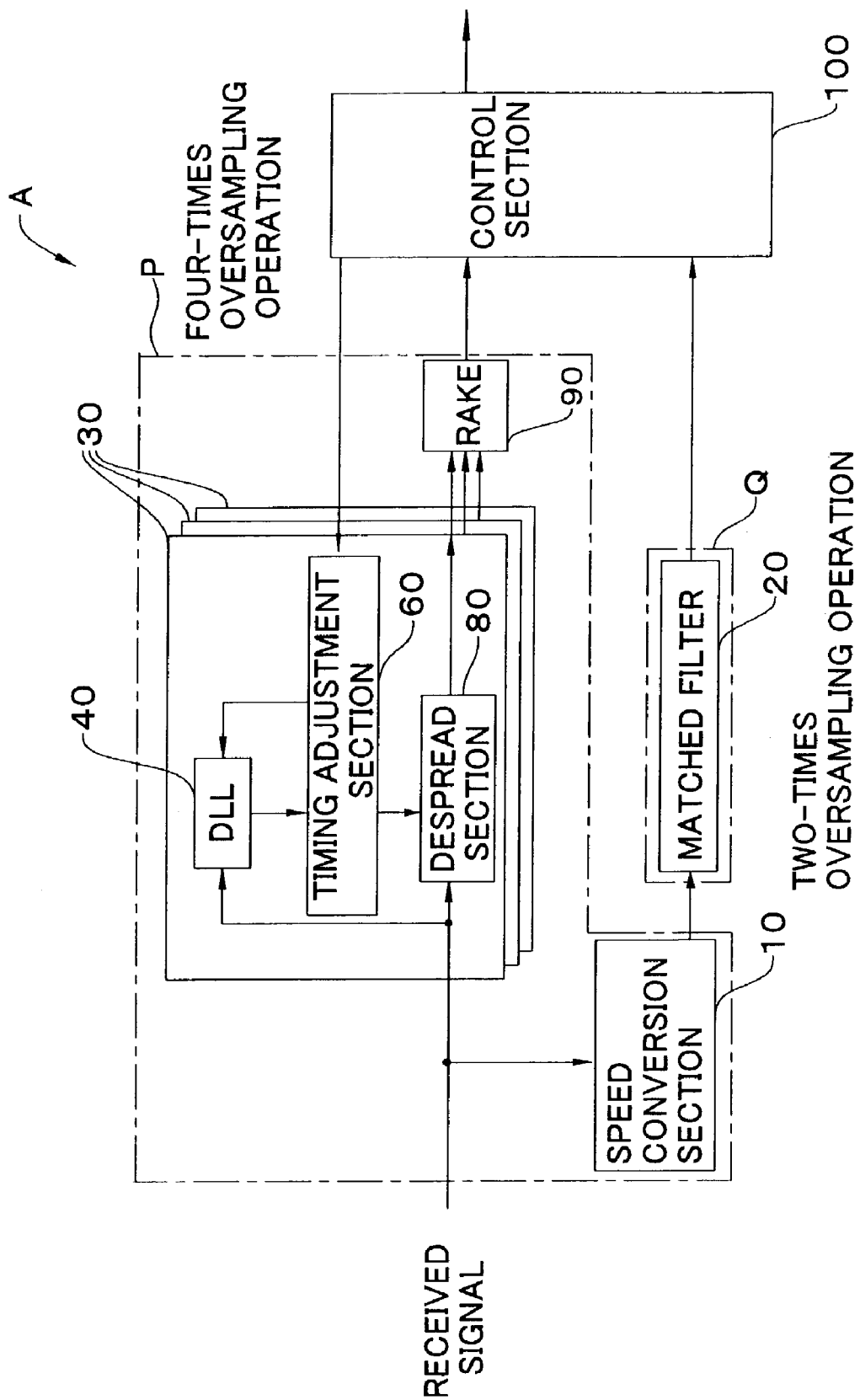
FIG. 1 is a block diagram showing the configuration of a receiver according to an embodiment of the invention.

A preferred embodiment of the invention will be described hereinbelow by utilization of drawings. As shown in FIG. 1, a receiver A of the invention comprises a speed conversion section (conversion section) 10, a matched filter 20, fingers (finger sections) 30, a RAKE combiner section 90, and a control section 100.

Here, the speed conversion section 10 is a circuit for subjecting a received signal to down-sampling. For instance, the speed conversion section converts a received signal which has been oversampled at a ratio of four times a chip rate to a received signal oversampled by two times. In other words, the receiving signal input to the receiver A is a digital signal obtained as a result of a received signal being oversampled by four times. The speed conversion section 10 subjects the thus-input received signal to diminishment processing, thus producing a received signal oversampled by two times. The speed conversion section may be called "speed conversion means" or a "speed converter."

Figure 2:
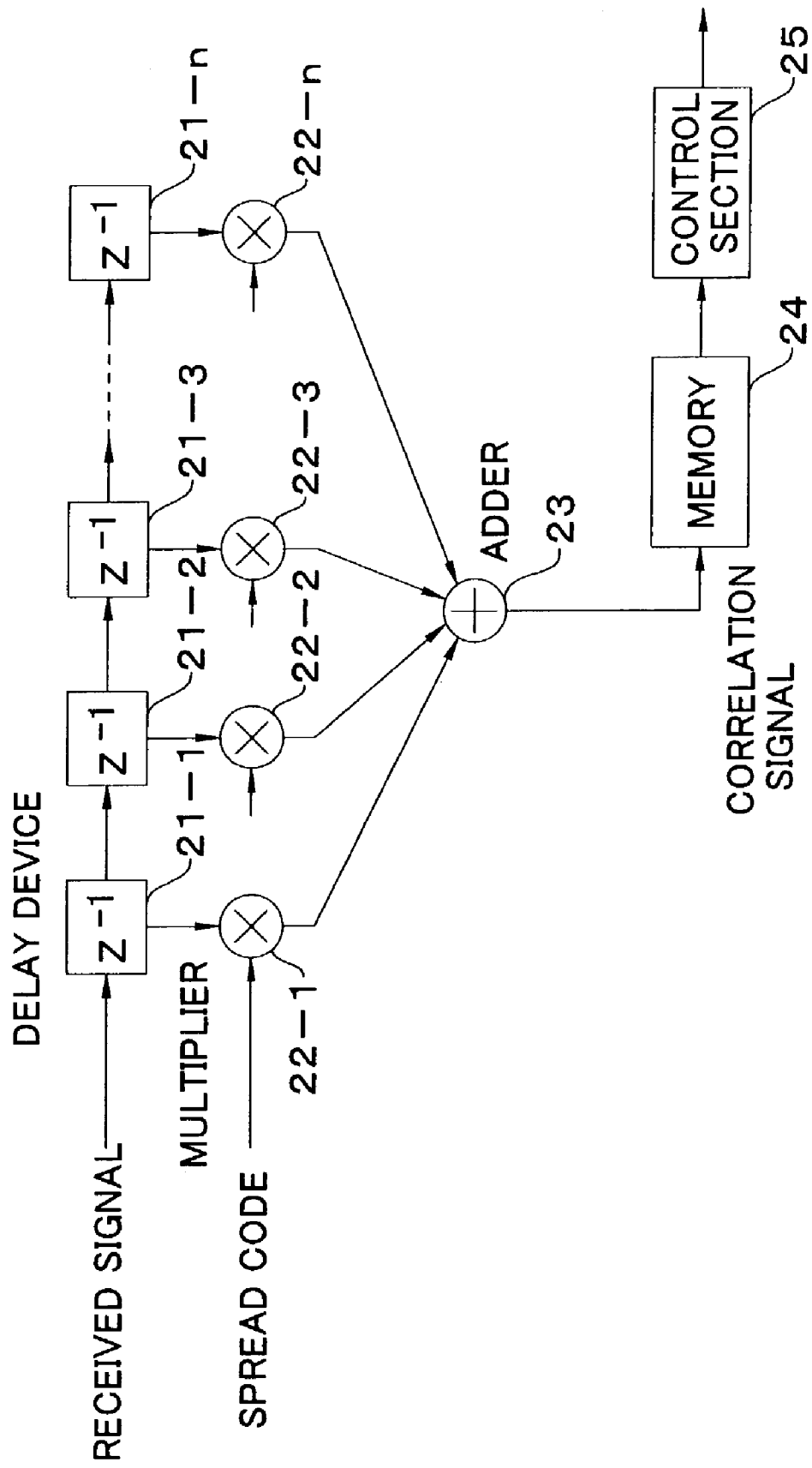
FIG. 2 is a block diagram showing the configuration of a matched filter.

The matched filter 20 determines a correlation value between a received signal and a spreading code, thereby outputting a path timing signal indicating a timing (path timing) of a peak position. As shown in FIG. 2, the matched filter 20 comprises delay devices 21-1 through 21-n; multipliers 22-1 through 22-n; an adder 23; a memory device 24; and a control section 25. Received signals are sequentially input to the delay devices 21-1 through 21-n from the speed conversion section 10. A fixed spreading code is input to the multipliers 22-1 through 22-n, where the received signals output from the delay devices 21-1 through 21-n are subjected to multiplication. Here, the adder 23 adds together results of multiplication operations performed by the multipliers 22-1 to 22-n. The memory device 24 stores a result of addition output from the adder 23. Specifically, the result of addition corresponding to one symbol is stored in the memory 24. The control section 25 detects a timing of peak position on the basis of the result of addition stored in the memory device 24 and outputs a path timing signal representing the timing. The path timing signal is essentially output on a per-symbol basis. Alternatively, the signal may be output on a per-symbols basis.

The path timing signal represents time information about a peak position. Strictly speaking, the path timing signal is a data set pertaining to time which has lapsed since the matched filter 20 started operation (the time will be described as a "relative time"). Specifically, the control section 25 detects a peak position on the basis of the data stored in the memory 24, computes the relative time of the peak position, and outputs the relative time data as a path timing signal.

In the embodiment, the received signal that has been sampled by two times is input into the matched filter 20 from the speed conversion section 10. The matched filter 20 acts as a matched filter which performs two-times oversampling.

Here, a peak position to be detected includes a sub-peak. In other words, timings for a plurality of paths are detected in consideration of a reflected wave or the like. A path timing signal for each of the timings is output.

Figure 5:
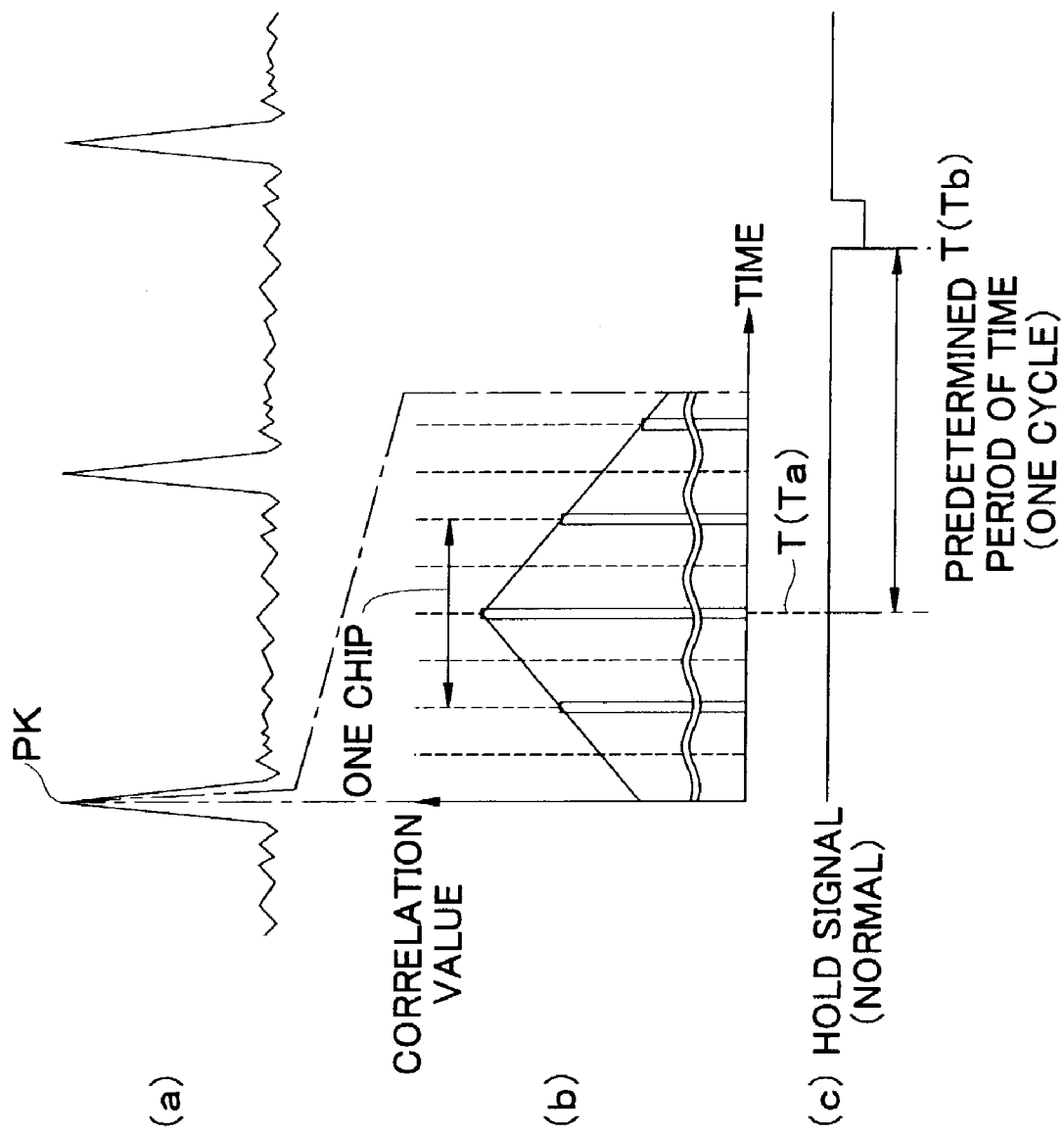
FIG. 5 is a descriptive view showing the operation of a receiver according to an embodiment of the invention.

In the above description, a path timing signal to be output from the matched filter 20 is a time data set pertaining to a peak position. However, the matched filter 20 may output directly to a control section 100 data pertaining to a correlation value for each timing as a path timing signal. In short, the matched filter 20 outputs directly to the control section 100 data pertaining to a correlation value for each timing of two-times oversampling. As shown in FIGS. 5(a) and 5(b), the matched filter 20 computes a correlation value on per-two-times-oversampling-cycle basis. The data pertaining to a correlation value are output to the control section 100. Take, for instance, a graph shown in FIG. 5(b) as an example, wherein data pertaining to a correlation value are output on per-one-half-chip basis. In this case, a two-times oversampling cycle corresponds to one-half a chip. Here, the matched filter 20 outputs a signal assuming a waveform such as that shown in FIG. 5(a). Strictly, as mentioned above, data pertaining to a correlation value are output on a per-two-times-oversampling-cycle basis. FIG. 5(b) shows a peak position in an enlarged manner.

It has been described that there are two cases; namely, a case the matched filter 20 outputs time data pertaining to a peak position (this is taken as a "first method"), and a case where the matched filter 20 outputs data pertaining to a correlation value in its present form (this is taken as a "second method"). Conceivable criteria for selecting either the first or second method are as follows: namely, the first method is employed when one peak is detected from one symbol, and the second method is employed when a plurality of peaks are detected from one symbol.

As mentioned above, an additional statement regarding the case where the matched filter 20 outputs a signal representing time data pertaining to a peak position as a path timing signal is that, for example, time data pertaining to Ta shown in FIG. 5(b) are output when time information about a peak position PK shown in FIG. 5(a) is output.

Each of the fingers 30 performs a despreading operation for each path of a received signal. The plurality of fingers 30 are provided so as to correspond to respective paths. Each of the fingers 30 has a DLL (delay locked loop) 40, a timing adjustment section 60, and a despread section 80.

In relation to a received signal, the DLL 40 outputs a difference between a correlation output pertaining to a spreading E(Early)-code and a correlation output pertaining to a spreading L(Late)-code. The DLL 40 comprises multipliers 42a, 42a, detectors 44a, 44b, a subtractor 48, and a loop filter 50. Here, the detector 44a summates signals output from the multiplier 42a and for each symbol period delivers a correlation output to the subtractor 48. The detector 44b summates signals output from the multiplier 42b and for each symbol period delivers a correlation output to the subtractor 48.

Figure 3:
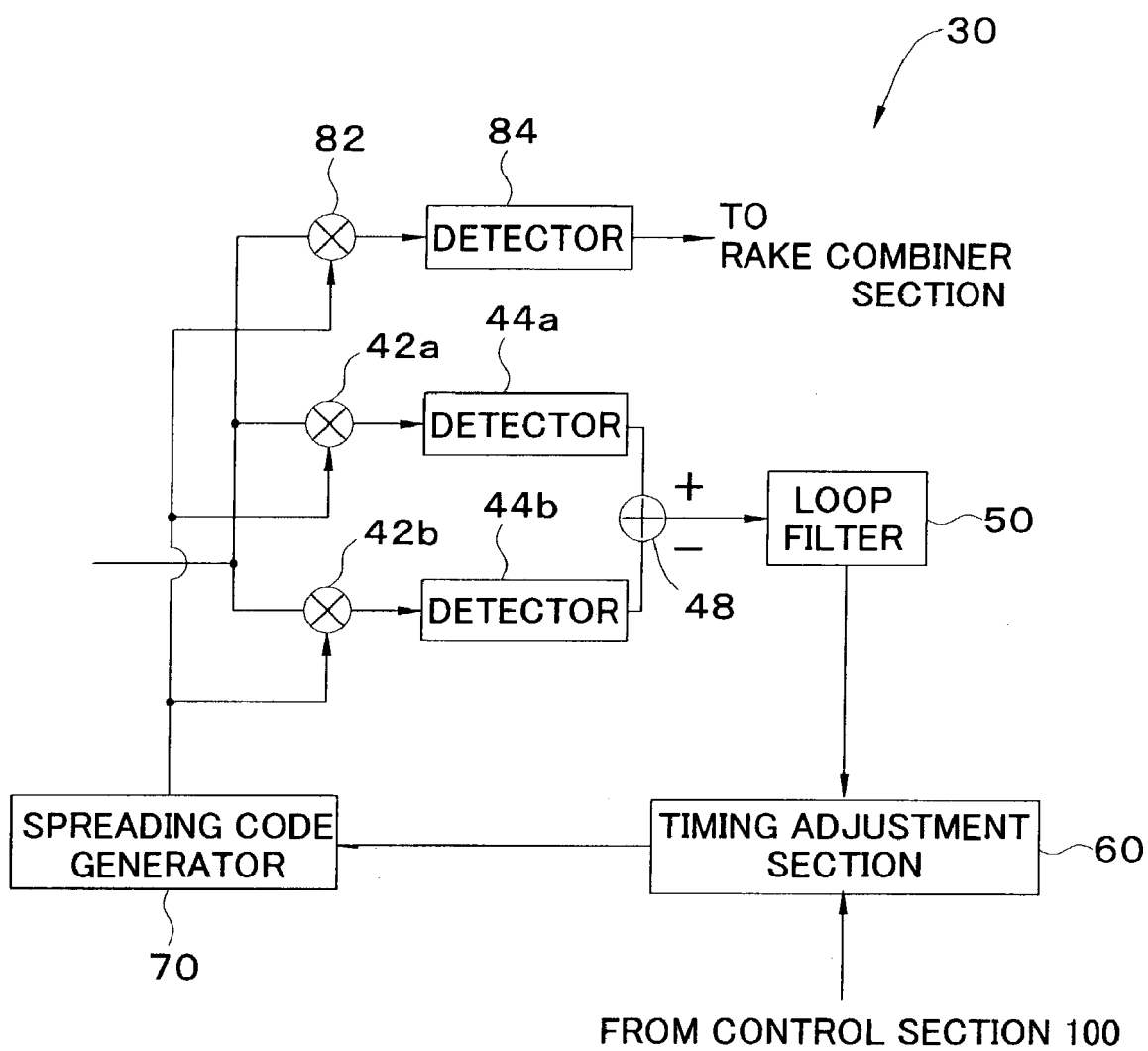
FIG. 3 is a block diagram showing the detailed configuration of a finger.
Figure 4:
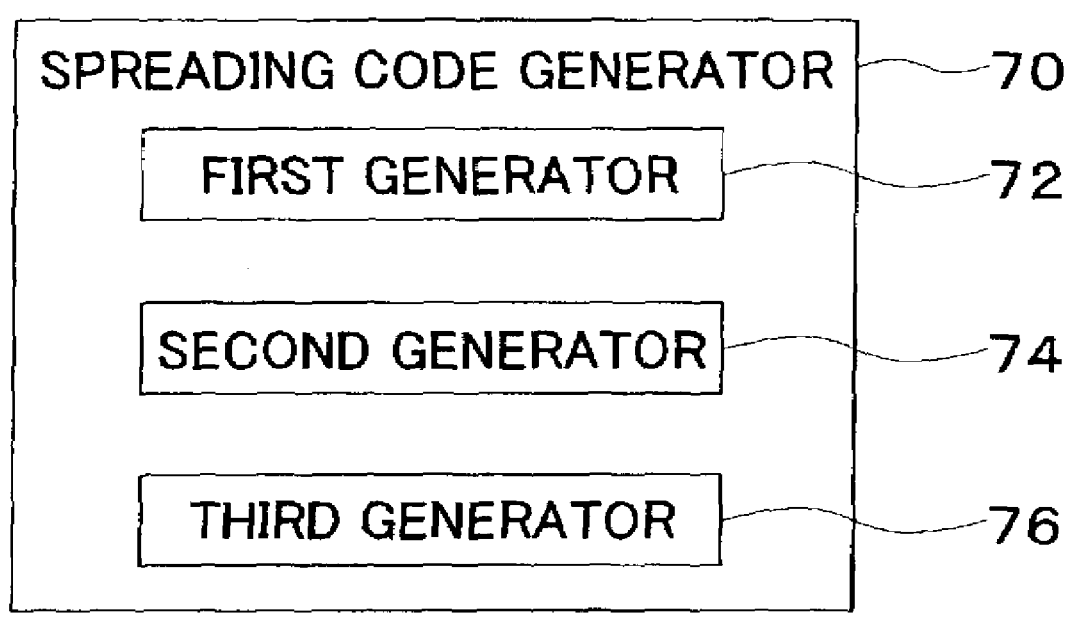
FIG. 4 is a block diagram showing the configuration of a spreading code generator.

As shown in FIG. 4, a spreading code generator 70 shown in FIG. 3 has a first generator 72, a second generator 74, and a third generator 76. The first generator 72 outputs a spreading code to the multiplier 42a, and the third generator 76 outputs a spreading code to the multiplier 42b. The first generator 72 and the third generator 76 are constituted in the DLL 40. The first generator 72 outputs a spreading code which is to serve as an E-code, and the third generator 76 outputs a spreading code which is serve as an L-code. The second generator 74 is constituted of a despread section 80.

Figure 7:
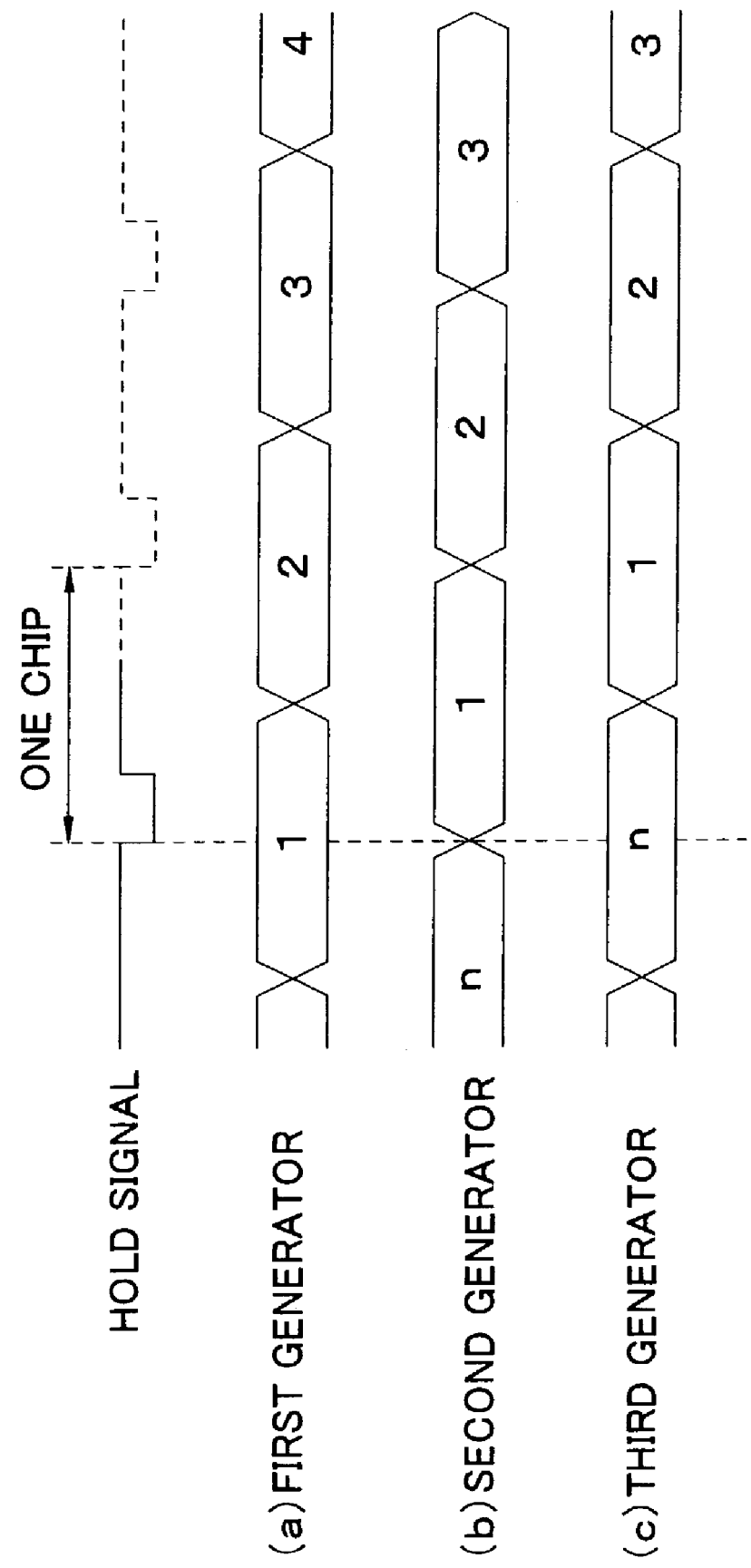
FIG. 7 is a descriptive view showing the operation of a receiver according to the embodiment of the invention.

The first generator 72, the second generator 74, and the third generator 76 sequentially output spreading codes with a delay corresponding to one-half of a chip. As shown in FIG. 7, the second generator 74 outputs a spreading code at a timing at which a HOLD signal (which will be described later) output from the timing adjustment section 60 has become LOW; that is, at a LOW timing (see FIG. 7 (b)). The first generator 72 outputs a spreading code at a phase which has advanced by one-half a chip in relation to the LOW timing (see FIG. 7 (a)). Further, the third generator 76 outputs a spreading code at a phase which lags behind the LOW timing by one-half a chip (see FIG. 7 (c)). Here, the third generator 76 outputs a spreading code while lagging behind the output timing of the first generator 72 by a period corresponding to one chip. In this case, the period of one chip corresponds to a delay time described in claims.

Figure 6:
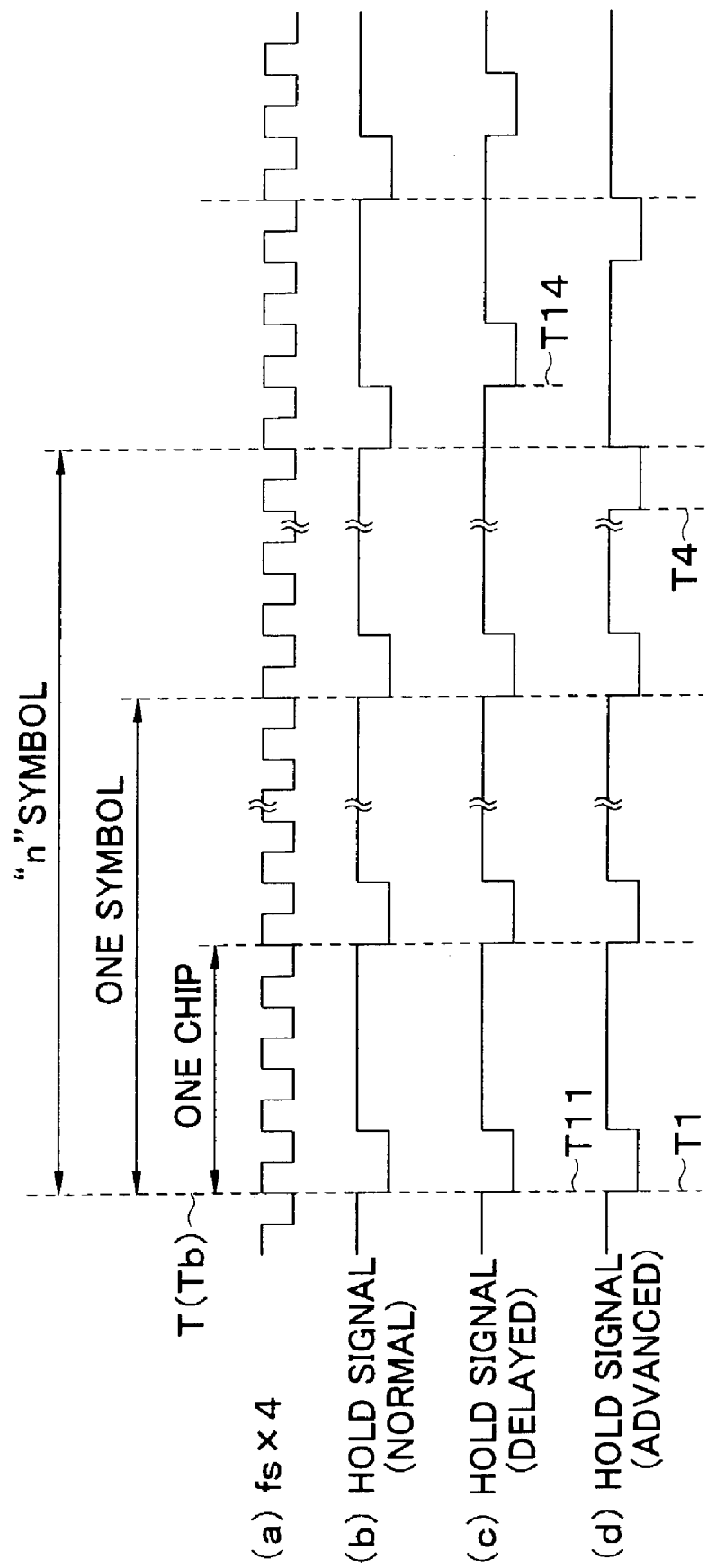
FIG. 6 is a descriptive view showing the operation of a receiver according to the embodiment of the invention.

The timing adjustment section 60 outputs a HOLD signal. As shown in FIGS. 6(a) and 6(b), the HOLD signal has a frequency of a chip rate and becomes LOW at a period of the frequency. Symbol "fs" shown in FIG. 6 designates a sampling frequency at a chip rate. Individual circuits (e.g., individual sections of the fingers 30, the RAKE combiner section 90, or the like) become operative at a timing at which the HOLD signal has become LOW.

The HOLD signal essentially becomes LOW at every cycle of the frequency of a chip rate. In a predetermined case, the phase of a LOW timing is compensated in accordance with a path timing signal delivered from the matched filter 20 by way of the control section 100 and a difference value output from the DLL 40.

When the difference value delivered from the DLL 40 represents a phase advance and when the phase advance has exceeded a predetermined threshold value, the timing adjustment section 60 performs a control operation for causing the phase of the LOW timing to delay from a timing indicated by the path timing signal output from the matched filter 20. In contrast, when the difference value delivered from the DLL 40 indicates a phase delay and the phase delay has exceeded a predetermined threshold value, the timing adjustment section 60 performs a control operation for causing the phase of the LOW timing to advance in relation to the timing indicated by the path timing signal output from the matched filter 20. As mentioned above, when the difference value has exceeded a predetermined threshold value, a phase is corrected. Here, a period during which a phase is caused to advance or delayed is set so as to correspond to one clock. Here, one clock is one operation clock cycle during which the fingers 30 are to operate. In short, one clock is based on a sampling frequency employed for four-times oversampling.

As mentioned above, the HOLD signal essentially becomes LOW at a predetermined cycle. The HOLD signal; particularly, a HOLD signal of LOW timing, corresponds to a phrase "timing signal of predetermined cycle which employs a path timing as a reference" provided in claims. Specifically, the HOLD signal corresponds to a "timing signal" in a phrase "a timing adjustment section which outputs a timing signal of predetermined cycle while a path timing detected by the matched filter is taken as a reference." The timing adjustment section may be called "timing adjustment means" or a "timing adjustment device."

Next, the despread section 80 despreads a received signal. The despread section 80 has the second generator 74, a multiplier 82, and a detector 84, such as those shown in FIGS. 3 and 4. The despread section 80 performs a despreading operation at a demodulation timing (i.e., a despread timing) based on the HOLD signal output from the timing adjustment section 60, and detailed explanations thereof will be provided later. The despread section may also be called "despread means" or a "despread device."

The RAKE combiner section 90 is a circuit for combining a received signal that has been despread by each of the fingers 30. In other words, there is performed processing for bringing signals of respective paths in phase with each other by means of compensating for the amount of phase rotation arising in the respective paths or processing for merging together the signals of respective paths that have been brought in phase with each other. The fingers 30 and the RAKE combiner section 90 demodulate a received signal.

The control section 100 controls operations of individual sections of a receiver A. In particular, the control section 100 has a function of converting relative time data indicated by a path timing signal to absolute time data when the path timing signal has been sent to the control section 100 from the matched filter 20. Here, the absolute time is a local time retained in the receiver A or a time (an hour) indicated by a local timer provided in the receiver A. The absolute time becomes a reference for the receiver A. The control section 100 sends the timing of a peak position to the timing adjustment section 60 after having expressed the timing as an absolute time.

When the matched filter 20 sends data pertaining to a correlation value in their present form to the control section 100, the control section 100 computes a relative time from the data pertaining to the correlation value, further computes the absolute time from the relative time, and sends information about the thus-computed absolute time to the timing adjustment section 60. Specifically, the control section 100 retains a program which computes a relative time from the thus-delivered data pertaining to a correlation value and computes an absolute time from the relative time. The control section 100 performs an arithmetic operation in accordance with the program. The control section 100 may be arranged so as to compute an absolute time directly from the data pertaining to a correlation value delivered from the matched filter 20.

In FIG. 1, the individual sections enclosed by an area P; that is, the fingers 30, the RAKE combiner section 90, and the speed conversion section 10 perform four-times oversampling operation. The matched filter 20 enclosed by an area Q performs two-times oversampling operation. Specifically, the individual sections enclosed by the area P perform four-times oversampling operations. Further, the matched filter 20 enclosed by the area Q performs two-times oversampling operation.

Operation of the receiver A having the foregoing configuration; particularly, a receiving method of CDMA communication scheme performed by the receiver A, will now be described. Descriptions provided below are directed toward a path search operation performed during a receiving operation; namely, initial synchronization capturing operation.

First, a received signal is input to the receiver A. The receiving signal has been sampled through over-sampling which is four times a chip rate and subjected to analog-to-digital conversion processing.

The speed conversion section 10 performs down-sampling operation, thereby converting the received signal to a two-times-oversampled received signal. The two-times-oversampled received signal is delivered to a matched filter 20. The matched filter 20 detects a peak position and outputs timing signals for respective paths; that is, path timing signals. The path timing signals are sent to the control section 100. The control section 100 sends the path timing signals to the timing adjustment sections 60 of the fingers 30. The process for detecting a peak position by use of the matched filter 20 corresponds to a path timing detection process described in claims.

Strictly, relative time data representing a peak position are sent as a path timing signal to the control section 100 from the matched filter 20. The control section 100 sends a path timing signal expressed as a relative time to the timing adjustment section 60 after the path timing signal has been converted to an absolute time. Here, the signal to be sent to the timing adjustment section 60 is still a signal representing a timing of a peak position.

When data pertaining to a correlation value are sent from the matched filter 20 to the control section 100, the control section 100 computes an absolute time representing a peak position on the basis of the data pertaining to a correlation value and sends the absolute value to the timing adjustment section 60 as a path timing signal.

On the basis of the path timing signal, the timing adjustment section 60 outputs a HOLD signal. In other words, a HOLD signal is brought into LOW at a time T (see FIG. 6) at which a timing represented by the path timing signal is taken as a reference, in connection with a clock cycle (see FIG. 6($a$)) of a four-times oversampling frequency. The HOLD signal becomes LOW at every chip rate unless a correction to be described later is performed.

Here, a timing at which the HOLD signal is first to become low is a time represented by a path timing signal; namely, a timing embodied by taking a timing representing a peak position as a reference. Specifically, a HOLD signal is brought into low at a timing after one cycle has passed from the absolute time. The period of "one cycle" can be set arbitrarily. For instance, the period of one cycle may be set to a period of one frame (equivalent to 150 symbols), a period of "n" symbols ("n" is a natural number), or a period of "n" chips ("n" is a natural number) For instance, when one cycle is taken as one frame, a HOLD signal is brought into low after lapse of period of one frame from the absolute time. Here, a HOLD signal maybe brought into low at a timing most close to a time represented by a path timing signal.

A timing at which the HOLD signal is first brought into low is the same as that at which the DLL 40 is started. In other words, the start timing is also set after lapse of one cycle from an absolute time. The HOLD signal is also brought into low at this start timing. In this way, the HOLD signal is brought into low while the absolute time is taken as a reference in an incipient phase of initial synchronization. The time represented by the path timing signal output from the matched filter 20 represents a time of day (or a time) for a peak position. Ta shown in FIG. 5(c) represents the time of day, and the HOLD signal becomes low at Tb after lapse of a predetermined period of time (i.e., one cycle) from Ta. Strictly speaking, T shown in FIG. 6 can be said to represent Tb.

Simultaneously, a four-times-oversampled received signal is also sent to the DLL 40. In the DLL 40, a difference value is computed by the multipliers 42a, 42b, the detectors 44a, 44b, and the subtractor 48. A correlation output between a received signal and E-code is output from the detector 44a to the subtractor 48, whereas a correlation output between the received signal and the L-code is output from the detector 44b to the subtractor 48, where the both correlation output are subjected to subtraction, thus computing a difference value. This subtractor 48 subtracts an output from the detector 44b from an output from the detector 44a. The resultant difference value shows an offset existing between a demodulation timing and the received signal. In principle, the difference value is computed on a per-symbol basis. The thus-computed difference value is sent to the timing adjustment section 60 by way of the loop filter 50. As mentioned above, the process for computing a difference value corresponds to an expression "difference value computation process" in claims.

At the time of multiplying operation to be performed by the multipliers 42a, 42b, a spreading code is output from the first generator 72 of the spreading code generator 70 to the multiplier 42a, and another spreading code is output from the third generator 76 to the multiplier 42b. In a phase of initial synchronization; that is, a phase of time T shown in FIG. 6, the timing adjustment section 60 brings the HOLD signal into low at a timing while the time T [strictly speaking, Ta (see FIG. 5)] represented by the timing signal output from the matched filter 20 is taken as a reference. A spreading code is output in accordance with this LOW timing.

The timing adjustment section 60 compares the difference value sent from the DLL 40 with a predetermined threshold value, thereby determining whether or not the difference value exceeds the threshold value. The difference value may be positive or negative. Strictly speaking, the magnitude of a difference value; that is, an absolute value of a difference, is compared with the threshold value. For example, provided that a difference value is taken as X and a threshold value is taken as S (S is positive), a determination is made as to whether or not |X|>S. The timing adjustment section 60 determines whether or not the magnitude of a difference value exceeds a predetermined threshold value; namely, whether or not the magnitude of a difference value is greater than a predetermined threshold value, thereby determining whether or not the phase of a HOLD signal is to be corrected.

If the difference value exceeds a threshold value, the timing adjustment section 60 outputs a HOLD signal so as to correct the LOW timing. Specifically, when the difference is positive; that is, when the phase of an operation clock lags behind the received signal, the timing at which the HOLD signal is to be brought into low is caused to advance by one clock (see FIG. 6(d)). In contrast, when the difference is negative; that is, the phase of an operation clock leads the received signal, the timing at which the HOLD signal is to be brought into low is delayed by one clock (see FIG. 6(c)). In this way, the process for correcting the timing at which the HOLD signal is to be brought into low corresponds to an expression "correction process" in claims.

For example, as shown in FIG. 8(a), when values designated with circles shown in FIG. 8(a) are sampled from a waveform of a correlation value through two-times oversampling, a timing T1 appearing at a "DETECTION PEAK POSITION" is taken as a timing of a peak position detected by the matched filter 20. Consequently, when the received signal is demodulated while the timing T1 is taken as a demodulation timing, a timing T2 is taken as an advanced arm position, and timing T3 is taken as a delayed arm position.

In the example shown in FIG. 8, the phase of an operation clock lags in phase behind the received signal. Hence, the difference value becomes positive. When the difference value exceeds the threshold value, the timing at which the HOLD signal is to be brought into LOW is caused to advance by one clock. As a result, as shown in FIG. 8(c), the demodulation timing coincides timing T4. Thus, a timing closer to the peak position can be taken as a demodulation timing. The embodiment shown in FIG. 8 corresponds to FIG. 6(d).

As shown in FIG. 9(a), when a value designated by a circle shown in FIG. 9(a) are sampled from a waveform of a correlation value through two-times oversampling, a timing T1 appearing at a "DETECTION PEAK POSITION" is taken as a timing of a peak position detected by the matched filter 20. Consequently, when the received signal is demodulated while the timing T11 is taken as a demodulation timing, the timing T12 is taken as an advanced arm position, as shown in FIG. 9(b).

In the embodiment shown in FIG. 9, the phase of an operation clock leads the received signal. Hence, the difference value becomes negative. When the difference value exceeds the threshold value, the timing at which the HOLD signal is brought into low is caused to lag by one clock. As shown in FIG. 9(c), the demodulation timing coincides with a timing T14. Thus, a timing closer to the peak position can be taken as a demodulation timing. The embodiment shown in FIG. 9 corresponds to FIG. 6(c).

As shown in FIG. 6, a timing at which a LOW timing is to be actually corrected is a timing which elapses "n" symbols ("n" is an integer of 2 or more) from time T which takes, as a reference, the path timing detected by the matched filter 20. In other words, as shown in FIG. 6, the timing at which the LOW timing is to be corrected is time T; that is, a timing at which "n" symbols ("n" is an integer of two or more) elapse from the timing at which the HOLD signal has first been brought into low. A difference value produced by averaging difference values computed for "n" symbols is compared with the threshold value, thereby determining whether or not the phase of a LOW timing is to be shifted. A determination is made as to whether or not the phase of the HOLD signal is corrected at a timing lapses "n" symbols from the time T.

A difference for one symbol is computed at a point in time after one symbol lapses from time T (see FIG. 6). Hence, correction of a LOW timing is possible at this point in time.

The threshold value to be used for the timing adjustment section 60 is set to such a value that a timing closer to the peak position is achieved by shifting the timing at which the HOLD signal is to be brought into low. Linear portions of substantially-mountain-shaped graphs shown FIGS. 8 and 9 are enlarged views of a peak correlation value of the received signal.

A method of correcting the phase of a timing signal employed in a CDMA communication scheme is performed in the foregoing manner.

The timing adjustment section 60 outputs a HOLD signal while a LOW timing thereof is corrected. On the basis of the corrected LOW timing, a spreading code is output from the spreading code generator 70 to the multiplier 42a, the multiplier 82, and the multiplier 42b.

Then, the DLL 40 performs multiplication of the received signal by the input spreading code and the like operation in the same manner as mentioned above.

In the despread section 80, the multiplier 82 multiplies the received signal by a spreading code output from the second generator 74. A despread signal is output from the detector 84 by means of processing performed by the detector 84.

When the LOW timing of the HOLD signal is corrected, despread processing is performed at a demodulation timing [i.e., a timing T4 in the cases shown in FIGS. 6(d) and 8 or a timing T14 in the case shown in FIGS. 6(c) and 9]. When the LOW timing of the HOLD signal has been shifted through correction, a spreading code is output to the despread section 80 at that LOW timing. The multiplier 82 performs multiplication operation at that timing. In other words, the corrected LOW timing acts as a corrected demodulation timing.

The despread signal output from the despread section 80 is sent to the RAKE combiner section 90, where each of the fingers 30 performs an operation for generating a despread signal; that is, a despread received signal. A received signal generated through RAKE combiner is output to the outside by way of the control section 100.

Naturally, when the phase of the HOLD signal is corrected, the HOLD signal is brought into low at a predetermined cycle; that is, every cycle of a chip rate frequency, until the phase is corrected next time.

In relation to corrections to be performed subsequent to the correction of the LOW timing of the HOLD signal, the phase of a clock signal may be corrected so as to become shifted on, e.g., a per-symbols basis in the same manner as mentioned above. Specifically, a chance for correcting a phase is provided on per-symbols basis. A determination may be made as to whether or not the phase should be corrected, on a per-symbols basis. Alternatively, there may be provided a chance for correcting a phase on a per-symbol basis.

The descriptions have explained the receiver while an operation for initial synchronization capturing is taken as an example. However, a chance for correcting the phase of a HOLD signal is not limited to a phase of initial synchronization capturing and may be provided in a subsequent step.

As mentioned above, the receiver A of the embodiment detects a rough path timing through use of a matched filter which is activated at a low ratio of oversampling. At the time of synchronization and holding of a synchronization with use of a high ratio of oversampling, DLLs originally provided in fingers for demodulation purposes are used, thereby reducing the size of a circuit of the matched filter. The overall circuit scale of the matched filter can be reduced. The receiver A of the embodiment enables omission of processing to be performed by the second circuit section of the CDMA receiver described in Japanese Patent Application Laid-Open No. 82973/2000, thereby contributing to a reduction in processing load. Eventually, the receiver A of the embodiment can detect a peak position with the accuracy of a sampling frequency of a received signal; that is, the accuracy of four-times oversampling. Hence, demodulation processing having a superior signal-to-noise ratio can be performed.

As shown in FIGS. 6(c) and 6(d), the descriptions have explained that the LOW timing of the HOLD signal is corrected at a timing which has lapsed "n" symbols ("n" is an integer of two or more) from a time T while a path timing detected by the matched filter 20 is taken as a reference. However, the invention is not limited to such an example. The LOW timing may be corrected at a timing located in the middle of certain symbols. More specifically, an average of difference values of DLLs 40 for n−1 symbols ("n" is an integer of three or more) is compared with a predetermined threshold value, thereby rendering a determination. When a LOW timing is to be corrected so as to advance or lag, the timing is corrected at a position in an nth symbol. If a LOW timing has been corrected, despread operation is performed at a demodulation timing based on the corrected LOW timing from the n+1$^{th}$ symbol.

The above descriptions have explained that, when a LOW timing of the HOLD signal is corrected, the timing is caused to advance or lag by one clock cycle. However, the invention is not limited to this; the LOW timing may be caused to advance or lag by a plurality of clock cycles.

In the descriptions, the first generator 72, the second generator 74, and the third generator 76, all belonging to the spreading code generator 70, output spreading codes while they lag behind each other by a period corresponding to one-half a chip. The description is based on that a period of time between the timing at which the first generator 72 is to produce an output and the timing at which the third generator 76 is to produce an output is taken as one chip. Alternatively, the period of time between the timing at which the first generator 72 is to produce an output and the timing at which the third generator 76 is to produce an output is taken as a time "t" of two chips or less. Further, a timing at which the second generator 74 is to produce an output may lag behind the timing at which the first generator 72 is to produce an output by half that time; that is, by t/2. The time "t" corresponds to an expression "lag time" in claims.

In the descriptions, the matched filter 20 has been described as performing two-times oversampling operation, and the fingers 30 have been described as performing four-times oversampling operation. However, the invention is not limited to those descriptions. So long as a matched filter is activated at a frequency which is one-over-n ("n" is an integer of two or more) times the sampling frequency of a received signal, other cases are also conceivable; e.g., a case where the matched filter 20 performs two-times oversampling operation and the fingers 30 perform eight-times oversampling operation or a case where the matched filter 20 performs two-times oversampling operation and the fingers 30 perform 16-times oversampling operation.

The above descriptions have explained that a magnitude of a difference value is compared with a predetermined threshold value and that, when the magnitude of the difference value has exceeded the threshold value, the phase of a HOLD signal is corrected. Alternatively, a threshold value for a positive difference value and another threshold value for a negative difference value may also be provided. A difference value may be compared with a corresponding threshold value. Specifically, in a case where a threshold value for a positive difference value is taken as S, a threshold value for a negative difference value is taken as −S. In the case of a positive difference value, a correction operation is performed when the difference value exceeds S. In short, provided that a difference value is taken as X, a correction operation is performed when S<X. In the case of a negative difference value, a correction operation is performed when the difference value is smaller than −S. In short, provided that a difference value is taken as X, a correction operation is performed when X<−S. Even such a case can be said to yield the same result as that yielded by a method of performing a correction operation when a difference value is determined to exceed a threshold value as a result of the magnitude of the difference value being compared with the threshold value.

INDUSTRIAL APPLICABILITY

As mentioned above, at the time of CDMA receiving operation, a receiver of the invention activates a matched filter to operate at a frequency of one-over-n (where "n" is an integer) times the sampling frequency of a received signal, thereby enabling a reduction in a circuit scale of the matched filter. A demodulation timing roughly grasped by the matched filter is corrected on the basis of information output from DLLs. Since the DLLs originally provided in the CDMA receiver are utilized, the circuit scale of the receiver and loads stemming from processing can be prevented from becoming greater.

What is claimed is:

1. A receiver of CDMA communications scheme, comprising:
    a matched filter which operates at a frequency of one-over-n ("n" is an integer) times a sampling frequency of a received signal and detects a path timing; and
    a finger section for despreading the received signal, wherein the finger section comprises
    a DLL which operates at the sampling frequency of the received signal and computes a difference value representing an offset between the received signal and a demodulation timing specified by the path timing detected by the matched filter;
    a timing adjustment section which outputs a timing signal of predetermined cycle while the path timing detected by the matched filter is taken as a reference, the timing adjustment section compensating for a phase of the timing signal on the basis of the difference value computed by the DLL; and
    a despread section which performs despreading operation at a demodulation timing specified by the timing signal output from the timing adjustment section,
    wherein the timing adjustment section causes the phase of the timing signal to advance when the magnitude of the difference value computed by the DLL exceeds a predetermined threshold value and when the difference value represents that the demodulation timing lags behind the received signal; and causes the phase of the timing signal to delay when the magnitude of the difference value computed by the DLL exceeds the predetermined threshold value and when the difference value represents that the demodulation timing is advanced in relation to the received signal.

2. The receiver according to claim 1, wherein the timing adjustment section causes the phase of the timing signal to advance or delay by an amount corresponding to one clock cycle or a plurality of clock cycles of sampling frequency of the received signal when the phase of the timing signal is compensated.

3. The receiver according to claim 1, wherein the timing adjustment section first outputs the timing signal after a predetermined period of time has lapsed from a path timing detected by a matched filter and compensates for the phase of the timing signal in accordance with the difference value computed by the DLL.

4. The receiver according to claim 1, wherein the DLL comprises a first generator for outputting a spreading code on the basis of a timing signal output from the timing adjustment section; a third generator for outputting a spreading code while lagging behind the timing at which the first generator produces an output, by a delay period corresponding to a period of two chips or less; and a second generator for outputting a spreading code while lagging behind half the delay period.

5. The receiver according to claim 1, further comprising a conversion section which down-samples the received signal to a frequency of one-over-n ("n" is an integer) times the sampling frequency of the received signal and outputs the down-sampled received signal to the matched filter.

6. The receiver according to claim 1, wherein, when the timing adjustment section compensates for the phase of the timing signal, the timing adjustment section first shifts the phase of the timing signal after two or more symbol periods of time have lapsed from the path timing detected by the matched filter.

7. A receiver of CDMA communications scheme, comprising:
    a matched filter which operates at a frequency of one-over-n ("n" is an integer) times a sampling frequency of a received signal and detects a path timing; and
    a finger section for despreading the received signal, wherein the finger section comprises
    a DLL which operates at the sampling frequency of the received signal and computes a difference value representing an offset between the received signal and a demodulation timing specified by the path timing detected by the matched filter;
    a timing adjustment section which outputs a timing signal of predetermined cycle while the path timing detected by the matched filter is taken as a reference, the timing adjustment section compensating for a phase of the timing signal on the basis of the difference value computed by the DLL; and
    a despread section which performs despreading operation at a demodulation timing specified by the timing signal output from the timing adjustment section,
    wherein the timing adjustment section causes the phase of the timing signal to advance when the difference value computed by the DLL is positive and exceeds a first predetermined threshold value; and causes the phase of the timing signal to delay when the difference value computed by the DLL is negative and less than a second threshold value, wherein the second threshold value corresponds to a negative of the first predetermined threshold value.

8. The receiver according to claim 7, wherein the timing adjustment section causes the phase of the timing signal to advance or delay by an amount corresponding to one clock cycle or a plurality of clock cycles of sampling frequency of the received signal when the phase of the timing signal is compensated.

9. The receiver according to claim 7, wherein the timing adjustment section first outputs the timing signal after a predetermined period of time has lapsed from a path timing detected by a matched filter and compensates for the phase of the timing signal in accordance with the difference value computed by the DLL.

10. The receiver according to claim 7, wherein the DLL comprises a first generator for outputting a spreading code on the basis of a timing signal output from the timing adjustment section; a third generator for outputting a spreading code while lagging behind the timing at which the first generator produces an output, by a delay period corresponding to a period of two chips or less; and a second generator for outputting a spreading code while lagging behind half the delay period.

11. The receiver according to claim 7, further comprising a conversion section which down-samples the received signal to a frequency of one-over-n ("n" is an integer) times the sampling frequency of the received signal and outputs the down-sampled received signal to the matched filter.

12. The receiver according to claim 7, wherein, when the timing adjustment section compensates for the phase of the timing signal, the timing adjustment section first shifts the phase of the timing signal after two or more symbol periods of time have lapsed from the path timing detected by the matched filter.

13. A receiving method of ODMA communications scheme, comprising:
a path timing detection step of detecting a path timing through use of a matched filter which operates at a frequency of one-over-n ("n" is an integer) times a sampling frequency of a received signal and detects a path timing;
a difference value computation step of computing a difference value representing an offset between the received signal and a demodulation timing specified by a path timing detected in the path timing detection step, through use of a DLL which operates at the sampling frequency of the received signal;
a timing signal output step for outputting a timing signal of predetermined cycle while the path timing detected in the path timing detection step is taken as a reference; and
a compensation step of compensating for a phase of the timing signal to be output in the timing signal output step, on the basis of the difference value computed in the difference value computation step,
wherein the phase of the timing signal is caused to advance in the compensation step when the magnitude of the difference value computed in the difference value computation step exceeds a predetermined threshold value and when the difference value represents that the demodulation timing lags behind the received signal, and the phase of the timing signal is caused to delay in the compensation step when the magnitude of the difference value computed in the difference value computation step exceeds the predetermined threshold value and when the difference value represents that the demodulation timing is advanced in relation to the received signal.

14. The receiving method according to claim 13, wherein the phase of the timing signal is caused to advance or delay by an amount corresponding to one clock cycle or a plurality of clock cycles of sampling frequency of the received signal when the phase of the timing signal is compensated in the compensation step.

15. The receiving method according to claim 13, wherein the timing signal is first output in the timing signal output step after a predetermined period of time has lapsed from a path timing detected in the path timing detection step, and the phase of the timing signal is compensated in the compensation step in accordance with the difference value computed in the difference value computation step.

16. The receiving method according to claim 13, wherein the compensation step first shifts the phase of the timing signal after two or more symbol periods of time have lapsed from the path timing detected by the path timing detection step.

17. A receiving method of CDMA communications scheme, comprising:
a path timing detection step of detecting a path timing through use of a matched filter which operates at a frequency of one-over-n ("n" is an integer) times a sampling frequency of a received signal and detects a path timing;
a difference value computation step of computing a difference value representing an offset between the received signal and a demodulation timing specified by a path timing detected in the path timing detection step, through use of a DLL which operates at the sampling frequency of the received signal;
a timing signal output step for outputting a timing signal of predetermined cycle while the path timing detected in the path timing detection step is taken as a reference; and
a compensation step of compensating for a phase of the timing signal to be output in the timing signal output process, on the basis of the difference value computed in the difference value computation step,
wherein the phase of the timing signal is caused to advance when the difference value computed in the difference value computation step is positive and exceeds a first predetermined threshold value, and the phase of the timing signal is caused to delay when the difference value computed in the difference value computation step is negative and less than a second threshold value, wherein the second threshold value corresponds to a negative of the first predetermined threshold value.

18. The receiving method according to claim 17, wherein the phase of the timing signal is caused to advance or delay by an amount corresponding to one clock cycle or a plurality of clock cycles of sampling frequency of the received signal when the phase of the timing signal is compensated in the compensation step.

19. The receiving method according to claim 17, wherein the timing signal is first output in the timing signal output step after a predetermined period of time has lapsed from a path timing detected in the path timing detection step, and the phase of the timing signal is compensated in the compensation step in accordance with the difference value computed in the defference value computation step.

20. The receiving method according to claim 17, wherein the compensation step first shifts the phase of the timing signal after two or more symbol periods of time have lapsed from the path timing detected by the path timing detection step.

* * * * *